US009552700B1

(12) United States Patent
Hauser et al.

(10) Patent No.: US 9,552,700 B1
(45) Date of Patent: Jan. 24, 2017

(54) CASINO GAME SYSTEM AND METHOD OF USE

(71) Applicants: David Hauser, Boston, MA (US); Thomas Mills, Jr., Boston, MA (US)

(72) Inventors: David Hauser, Boston, MA (US); Thomas Mills, Jr., Boston, MA (US)

( * ) Notice: Subject to any disclaimer, the term of this patent is extended or adjusted under 35 U.S.C. 154(b) by 272 days.

(21) Appl. No.: 13/944,784

(22) Filed: Jul. 17, 2013

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .................................. *G07F 17/3293* (2013.01)

(58) Field of Classification Search
CPC ............. A63F 1/00; A63F 13/00; G07F 17/32
See application file for complete search history.

(56) References Cited

U.S. PATENT DOCUMENTS 5,165,693 A * 11/1992 Handlon, Sr. ................. 273/298
5,755,621 A * 5/1998 Marks et al. ................... 463/42
2007/0075496 A1* 4/2007 Roethel ......................... 273/292

* cited by examiner

*Primary Examiner* — Kevin Y Kim
(74) *Attorney, Agent, or Firm* — Greenberg Traurig LLP

(57) ABSTRACT

A card game system/method pitting players against a live or virtual dealer. Players make two mandatory wagers and optionally place bonus and jackpot wagers followed by each player and the dealer receiving six cards. Each player and the dealer must set the six cards into three, two-card hands based on pre-established rules. The main and play wagers are resolved based on a comparison of the player's three hands to the dealer's three hands, respectively. The bonus wager relates to the strongest five-card poker hand formed using the six cards and the jackpot is paid if the player wins all three hands and the two cards of the first hand meet a minimum threshold (e.g., Ace high or better). An automatic winning hand may be utilized as well. For example, any player receiving the King of Spades and King of Clubs would win their main and play wagers automatically. A player v. player (e.g., home version) version of the game is also disclosed.

12 Claims, 5 Drawing Sheets

CASINO GAME SYSTEM AND METHOD OF USE

FIELD OF THE INVENTION

The embodiments of the present invention relate to a casino game system which can be played in live and electronic environments.

BACKGROUND

The popularity of gaming continues to grow as a form of entertainment. Gaming is offered in brick and mortar locations as well as virtually online via desktops, laptops and/or hand-held smart phones. Gaming comes in many forms including table games, electronic, video and/or online varieties. Despite the vast number of different casino-style games in the market, there is a never ending need for new gaming methods and systems which attract new players and retain existing players.

Thus, it would be advantageous to develop a casino-style game system which: (i) is easy to play; (ii) includes larger potential payouts and (iii) is capable of play in live and electronic environments.

SUMMARY

The embodiments of the present invention are directed to a card game pitting players against a dealer (which in an electronic version is a virtual dealer controlled by a processor). The game may be marketed under a fanciful name such as Showdown, Showdown Poker or other name. In one embodiment, players place two equal, mandatory wagers, deemed an ante/main wager and play wager, and optionally place a bonus wager and jackpot wager followed by each player and a dealer receiving six cards. Each player must set his/her six cards into three two-card hands wherein a high and must rank (using two card poker ranks excluding straights/flushes) at least as high as either the middle or low hand and the middle hand must rank at least as high as the low hand. Players may double the play wagers at this stage. The dealer then reveals his/her six cards and sets three two-card hands according to established house rules (known as the house way). The main wager and play wager are resolved based on a comparison of the player's high, middle and low hands to the dealer's high, middle and low hands, respectively. The bonus wager relates to the strongest five-card poker hand which can be formed using the six cards and is not dependent on the main wager or play wager. The jackpot wager is paid if the player wins all three hands against the dealer and the two cards of the first hand meet a minimum threshold (e.g., Ace high or better). An automatic winning hand may be utilized as well. For example, any player receiving the King of Spades and King of Clubs would win their main and play wagers automatically.

In one embodiment, the game may be played on a live gaming table with a live dealer. In other embodiments, the game may be played over a computer network, including the Internet, or on standalone gaming machines with processing power or linked thereto (e.g., server). An embodiment suitable for home play is also disclosed.

Other variations, embodiments and features of the present invention will become evident from the following detailed description, drawings and claims.

DETAILED DESCRIPTION

Figure 1:
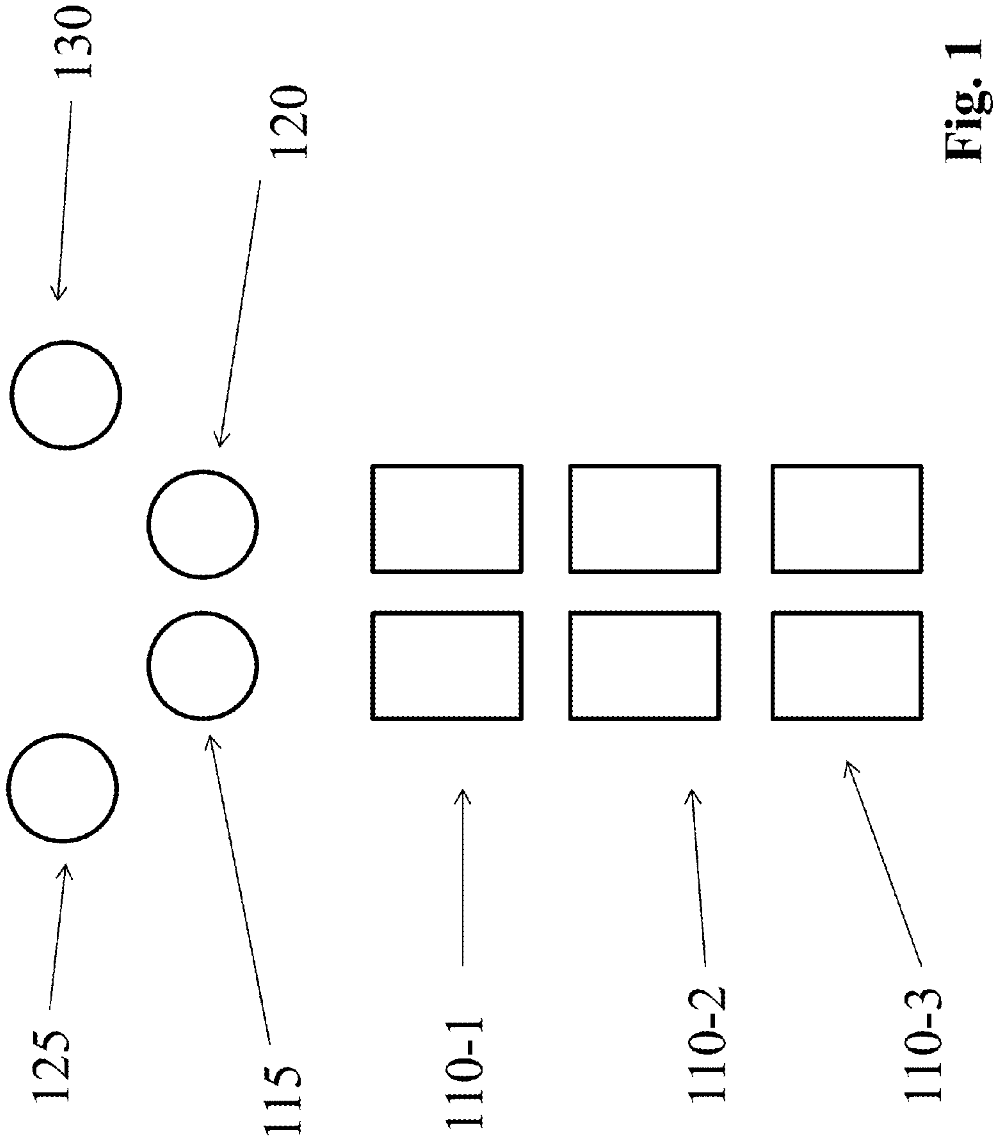
FIG. 1 illustrates an exemplary player game area according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

FIG. 1 shows an exemplary player game area 100 of the type which may be depicted multiple times (once for each player position) on a table game layout (or gaming device display) to facilitate the embodiments of the present invention. The player game area 100 generally includes card placement areas 110-1 through 110-3, main wager area 115, play wager area 120, bonus wager area 125 and jackpot wager area 130. The card placement areas 110-1 through 110-3 (low, middle and high hands) are each positioned to receive two cards as detailed below when the player's hands are set.

Figure 2:
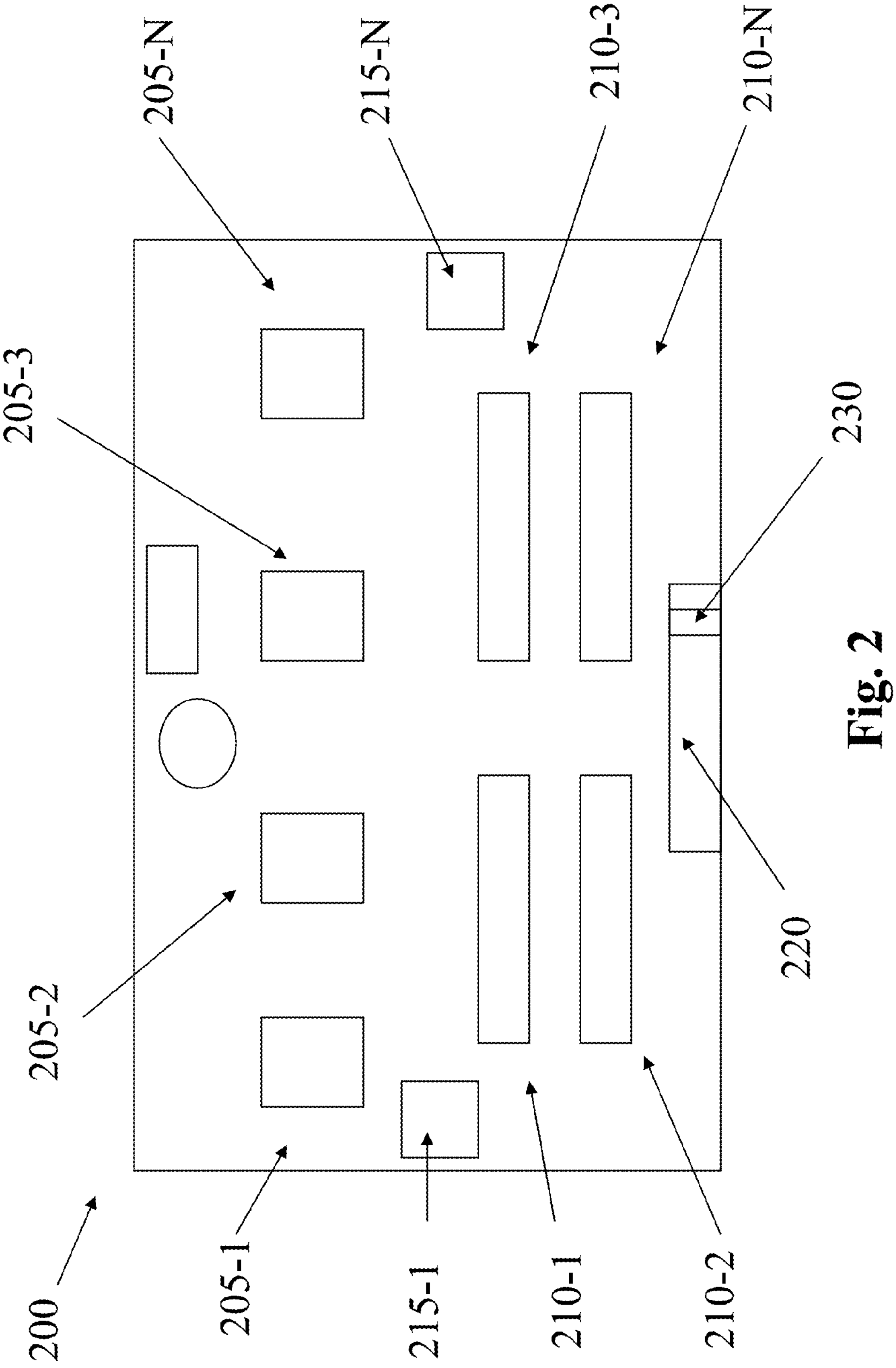
FIG. 2 illustrates a block diagram of a standalone electronic gaming device for conducting a game according to the embodiments of the present invention.

The embodiments of the present invention may be facilitated by an electronic gaming device whereby a single player plays against the electronic gaming device's processor (virtual dealer) as described herein. A block diagram of the electronic gaming device 200 is shown in FIG. 2. The exemplary electronic gaming device 200 may include a central processing unit (CPU) also deemed a processor 205 which controls the electronic gaming device 200 based on instructions stored in program read-only memory (ROM) 210 and pay table ROM 215. Program ROM 210 stores executable instructions related to the operation of the gaming device and which are generally permanent. CPU 205 may be connected to a video controller 220 which provides output to one or more video displays 225. Similarly, an audio controller 230 provides audio output as dictated by the CPU 205 through speakers 235. The aforementioned components, and others, may be attached to a circuit board forming a motherboard. In another embodiment, the electronic gaming device may be linked to a central game server which allows players to select from a number of games via the electronic gaming device 200. In such an embodiment, one or more processors integrated into the central server control the gaming device 200 based on instructions stored in program read-only memory.

A user interface 240 may respond to buttons on button panel or display incorporating touch screen technology or any other devices providing means for users to communicate with, and instruct, the electronic gaming device 200. Wager memory 245 stores an amount of money/credits deposited into the electronic gaming device 200 by a player and specific wager information related to each play of the electronic gaming device 200. Payout system 250 includes a coupon printer or similar device for receiving money/coupon from the electronic gaming device 200.

Those skilled in the art will recognize that the configuration and features of the electronic gaming device 200 disclosed herein are exemplary and may be altered in any number of ways without impacting the embodiments of the present invention.

Figure 3:
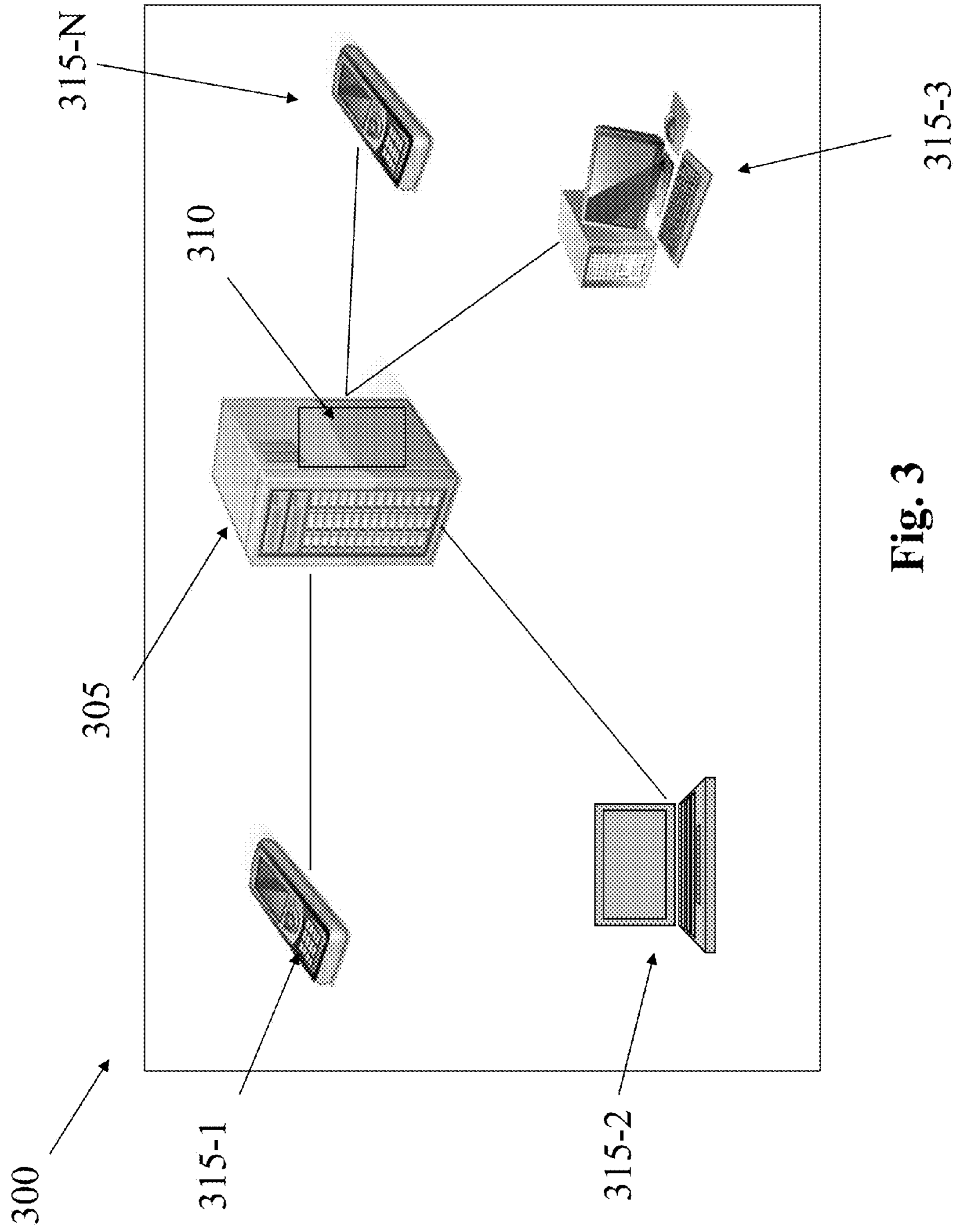
FIG. 3 illustrates a block diagram of a wireless system accessible by a mobile device for conducting a game according to the embodiments of the present invention.

FIG. 3 shows a block diagram of a wireless system 300 which may be used to facilitate remote play of the game according to the embodiments of the present invention. The wireless system 300 comprises a game server 305, including one or more processors 310 running game software, and remote devices 315-1 through 315-N (e.g., smart phones) configured to access said game server 305 facilitating game play on the remote devices 315-1 through 315-N.

The embodiments of the present invention are directed to a card game pitting players against a dealer or a virtual dealer controlled by a processor. In general, the card game involves dealing each player and a dealer six cards from a conventional deck of fifty-two cards and players and the dealer then setting the six cards into three two-card hands (first, second and third hand also termed front, middle and back hands) and then comparing each respective player hand against the dealer's hands. A series of wagers are resolved based on the comparison. A bonus wager relates to the strongest five-card poker hand which can be formed using the six cards and is not dependent on the main wager or play wager. The jackpot wager is paid if the player wins all three hands against the player and the two cards of the first hand meet a minimum threshold (e.g., Ace high or better).

Figure 4:
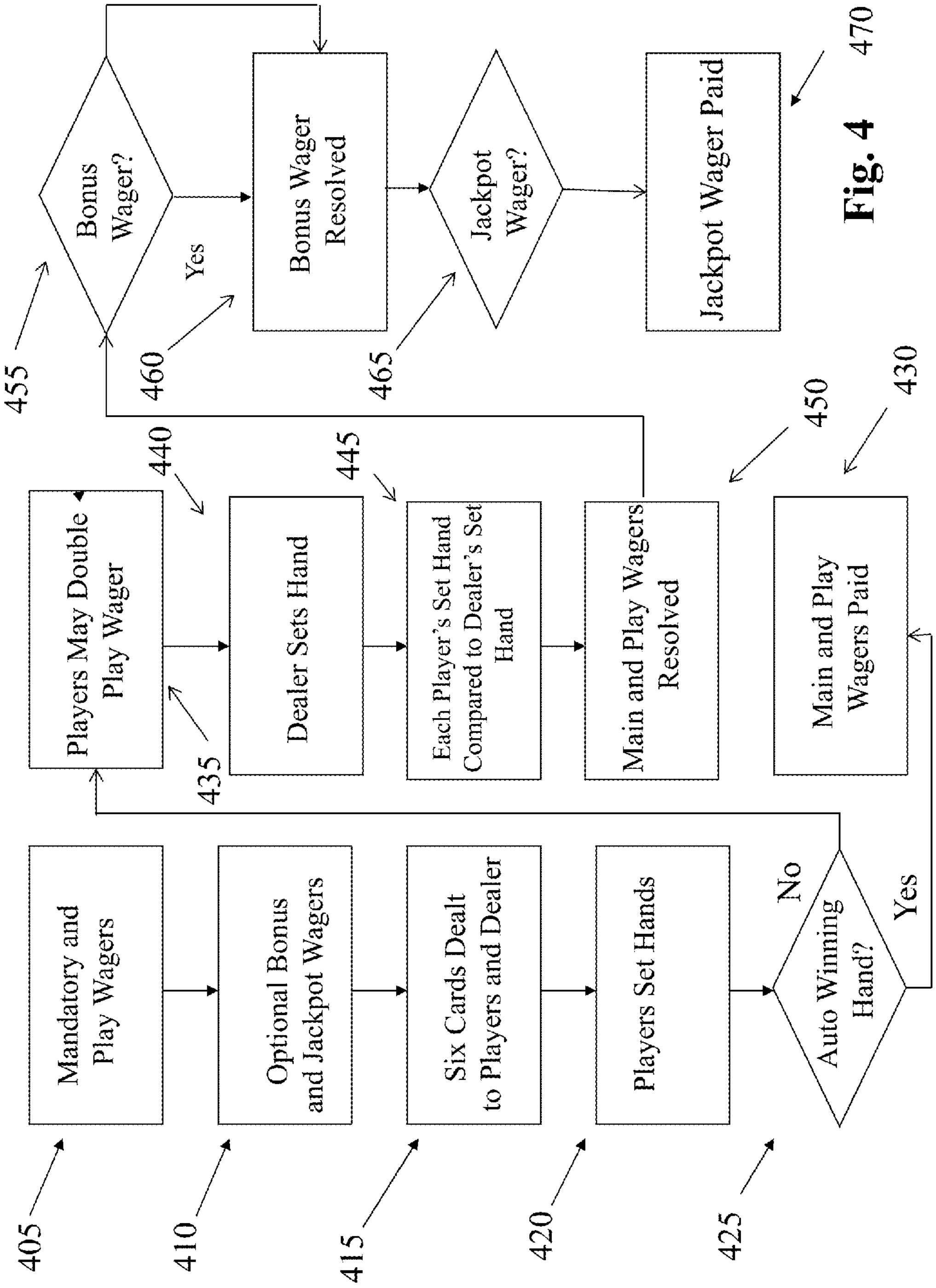
FIG. 4 illustrates a flow chart detailing one methodology for conducting a live game according to the embodiments of the present invention.

FIG. 4 shows a flow chart 400 detailing one methodology for conducting a game according to the embodiments below. At 405, players place mandatory main wagers and play wagers of equal amounts. In another embodiment, the main wager and play wagers may be different amounts. At 410, players may place optional bonus and jackpot wagers. In one embodiment, the bonus wager limits are set by the house (e.g., \$1-\$25) while the jackpot wager amount is set at \$1. At 415, a dealer deals each player and himself or herself six cards face down from a conventional deck of fifty-two cards (i.e., fifty-two cards comprising four suits (Hearts, Diamonds, Spades and Clubs) with cards numbered from 2 to 10, Jack, Queen, King and Ace. At 420, each player sets the six cards into three two-card hands. Setting the hand is pursuant to certain pre-established rules. In one embodiment, the pre-established rules require that the high hand must rank as high as, or higher than, at least the middle hand or low hand, and the middle hand must rank as high as, or higher than, the low hand. In one embodiment, an optimal strategy suggests that players set hands as follows: (i) with no pairs, make the low hand as strong as possible; (ii) with one pair, keep the pair together if it is Jacks or lower, otherwise split the pair and in either case make the low hand as strong as possible; (iii) with two pair, keep the pairs together unless at least one pair is Queens or higher whereby the highest pair should be split; and (iv) with three pairs keep the pairs together. In one embodiment, if the player sets the hand wrong, the player loses all wagers. Alternatively, the house may assist the player with re-setting the hand or providing a second chance to set the hand. At 425, if is determined whether any player has an automatic winning hand. In one embodiment, the automatic winning hand comprises a player being dealt the King of Spades and King of Clubs (i.e., the two black Kings in the deck). In other embodiments, the automatic winning hand may be based on other card combinations (e.g., two specific Aces) and/or more or less than two card combinations (e.g., one specific Ace). If the player has been dealt an automatic winning hand, at 430, the player's main and play wagers are paid off. At 435, the players are afforded the option to double the play wagers. Doubling the play wager is not restricted but basic strategy suggests that the play wager should be doubled if: (i) with no pairs, the three hands are at least Queen high, King high and Ace high; (ii) with one pair, the two lowest hands are at least Jack high and Ace high; (iii) with two pair, the lowest hand is at least ten high. At 440, the dealer sets his or her six cards into three two-card hands according to pre-established house rules. In one embodiment, the pre-established house rules are as follows in Table 1 and based on the strength of the poker hand formed by the six cards.

TABLE 1

| Hand Strength | House Way |
|---|---|
| No Pair Hand | 3rd and 4th highest cards placed in the low hand; 2nd and 5th highest cards placed in the middle hand; and 1st and 6th highest cards placed in the high hand<br>Example 2-4-7-8-Q-A sets as 87/Q4/A2 |
| Single Pair of Aces Hand | 1st and 2nd highest cards placed in the low hand; an Ace and 4th highest card placed in the middle hand; and an Ace and 3rd highest cards placed in the high hand<br>Example 2-4-8-J-A-A sets as J8/A2/A4 |
| Single Pair Hand other than Aces | 2nd and 3rd highest cards placed in the low hand; 1st and 4th highest cards placed in the middle hand; and the pair is placed in the high hand<br>Example 2-4-8-J-K-K sets as 84/J2/KK |
| Three of a Kind | Same as Single Pair other than Aces except one of the trips is used as one of the non-pair cards (i.e., 1st-4th highest card) |
| Two Pair (One Pair is Aces) | Ace and 2nd highest cards placed in the low hand; Ace and 1st highest cards placed in the middle hand; and the pair is placed in the high hand<br>Example 2-4-8-8-A-A sets as A2/A4/88 |
| Two Pair Non-Aces | Two Non-Pair cards placed in the low hand; 2nd highest pair placed in the middle hand; and the highest pair is placed in the high hand<br>Example 2-4-8-8-Q-Q sets as 24/88/QQ |
| Trips + One Pair | Play as Two Pair (Non-Aces) with one of the trips used as the Two Non-Pair cards place in the low hand |
| Two Trips | Play as Two Pair (Non-Aces) above with one card from each pair of trips used as the Two Non-Pair cards place in the low hand |
| Three Pair Hand | Place lowest pair in the low hand; place second highest pair in the middle hand; and place the highest pair in the high hand<br>Example 2-2-6-6-8-8 sets as 22/66/88 |

At 445, each player's low, middle and high hands are compared to the dealer's low, middle and high hands, respectively. In one embodiment, hand ranks include pairs and unpaired high cards (i.e., no straight or flushes). In such an embodiment, a pair of Aces is the highest hand possible. In other embodiments, straight and/or flushes may be considered. At 450, main and play wagers are resolved whereby: (i) if the player's low hand loses to (i.e., is outranked by) the dealer's low hand, the player's main and play wagers lose; (ii) if the player's low hand beats the dealer's low hand but the player's middle hand loses to the dealer's middle hand, the player's main wager pushes and play wager loses; (iii) if the player's low and middle hands beat the dealer's low and middle hands, respectively, but the player's high hand loses to the dealer's high hand, the player's main wager is paid even money and the play wager loses; and (iv) if the player's low, middle and high hands beat the dealer's low, middle and high hands, respectively, the player's main wager is paid even money and the play wager is paid 2 to 1. At 455, it is determined if the bonus wager was placed. If so, at 460, the bonus wager is resolved using a pay table to determine the highest five card poker hand formed by the six cards and comparing the poker hand rank to a pre-established pay table. Tables 2A-2C depict various optional bonus wager pay tables with house edges of 4.78%, 8.76% and 2.89%, respectively.

TABLE 2A

| Hand | Payout |
|---|---|
| No Pair | 0 |
| One Pair | 0 |
| Two Pair | 2 to 1 |
| Three of a Kind | 3 to 1 |
| Straight | 5 to 1 |
| Flush | 8 to 1 |
| Full House | 20 to 1 |
| Four of a Kind | 50 to 1 |
| Straight Flush | 250 to 1 |
| Royal Flush | 1000 to 1 |

TABLE 2B

| Hand | Payout |
|---|---|
| No Pair | 0 |
| One Pair | 0 |
| Two Pair | 2 to 1 |
| Three of a Kind | 3 to 1 |
| Straight | 6 to 1 |
| Flush | 8 to 1 |
| Full House | 15 to 1 |
| Four of a Kind | 50 to 1 |
| Straight Flush | 100 to 1 |
| Royal Flush | 500 to 1 |

TABLE 2C

| Hand | Payout |
|---|---|
| No Pair | 0 |
| One Pair | 0 |
| Two Pair | 2 to 1 |
| Three of a Kind | 3 to 1 |
| Straight | 6 to 1 |
| Flush | 10 to 1 |
| Full House | 20 to 1 |
| Four of a Kind | 50 to 1 |
| Straight Flush | 100 to 1 |
| Royal Flush | 250 to 1 |

The bonus hand wager is independent of whether the main or play wagers were won or lost. That is, as long as the player placed a bonus wager the player is eligible to win a bonus payout based on the bonus payout pay table. At 465, it is determined if the jackpot wager was placed. If so, at 470, the jackpot wager is resolved based on the player's low, middle and high hands each beating the dealer's low, middle and high hands, respectively, and the low hand achieving a minimum hand rank. In one embodiment, the minimum hand rank is Ace high. Tables 3A and 3B depict exemplary jackpot payout schemes based on fixed payouts. Tables 4A and 4B depict progressive jackpot payout schemes. Progressive pay tables are well-known in the industry and generally include certain large payouts which grow until won at which point they re-set to a minimum amount (e.g. $10,000). Such large payouts are funded from a small percentage of bets placed during play of the subject game.

TABLE 3A

| Front Hand | Payout |
|---|---|
| Ace high | $20 |
| Pair 2-10 | $50 |
| Pair of Jacks | $500 |
| Pair of Queens | $5,000 |
| Pair of Kings | $50,000 |

TABLE 3B

| Front Hand | Payout |
|---|---|
| Ace high | $20 |
| Pair 2-10 | $100 |
| Pair of Jacks | $500 |
| Pair of Queens | $1,000 |
| Pair of Kings | $10,000 |

TABLE 4A

| Front Hand | Payout |
|---|---|
| Ace high | $20 |
| Pair 2-10 | $50 |
| Pair of Jacks | $500 |
| Pair of Queens | 10% |
| Pair of Kings | 100% |

TABLE 4B

| Front Hand | Payout |
|---|---|
| Ace high | $20 |
| Pair 2-10 | $100 |
| Pair of Jacks | $500 |
| Pair of Queens | 10% |
| Pair of Kings | 100% |

In one electronic embodiment, players may play multiple hands simultaneously at different virtual tables. Such an embodiment provides sustained, fast-paced action for the player as downtime associated with a single game is reduced.

A home version pits players against one another wherein a player holding a strongest (i.e., highest ranking) final hand wins the game. A player v. player version may also be played in a casino or other gaming establishment as well. In general, during each round of the game, players discard and reveal two cards simultaneously and the player revealing the lowest hand is eliminated until during a final round, involving two players, one player remains and is deemed the winner. For example, in a three player game, each player receives four cards. During a first round, each player reveals two cards with the player revealing the weakest hand eliminated. A second round involves the two remaining players revealing their final two cards with the player revealing the weakest hand being eliminated and the other player being deemed the winner. A four player game is played the same as the three player game except with three rounds and each player receiving six cards. A five player game is played the same as the four player game except with four rounds and each player receiving eight cards. A six player game is played the same as the five player game except the two players with the two weakest hands are eliminated in one of the four rounds. In a seven player game, each player receives seven cards and four rounds are played during which the two players with the weakest hands are eliminated from two rounds and a final round is a single card round. An eight player game is played the same as the six player game except the three players with the three weakest hands are eliminated in one of the four rounds. This home version of the game involves surviving early rounds without using all of your strong cards which can then be used on the later and final rounds.

Hand strength is determined by the highest card in the hand. If multiple players have the same high card, the second card in the hand determines the winner. If more than one player as the same two cards in their hand, a tie-breaker is used. In one embodiment, the tie-breaker comprises each player involved in the tie selecting a random card from the cards not used during the game. This also applies if multiple players have the same card in a single card round (e.g., the final round of the seven player game).

This player v. player game is suitable for gambling as well. In one embodiment, each player puts an equal amount of money into a pot which is won by the winning player. The pot may be shared by a winning player and second place player. In another embodiment, wagers may be placed during each round akin to conventional poker. In another embodiment, a spoiler hand is dealt and played by the first player to be eliminated. If the player playing the spoiler hand wins, all players re-ante and the double pot is awarded to the winner of the next hand of the game. The spoiler hand is dealt with two less cards than the other hands to accommodate for the cards revealed in round one. The spoiler hand is ideal for the three player and four player games. For example, in a four player game where players receive eight cards the spoiler hand receives six cards. Thus, the player eliminated in the first round plays the six card spoiler hand.

In another embodiment, a kill hand is implemented. A kill hand is a pre-established hand deemed the highest ranking hand possible. In one embodiment, a hand comprising a six and nine of spades is the kill hand. So, in this embodiment, the kill hand beats a pair of Aces and other conventional hands which normally outrank a six and nine.

The player v. player version of the game may also be facilitated by software and an electronic system or global computer network (e.g., the Internet).

Figure 5:
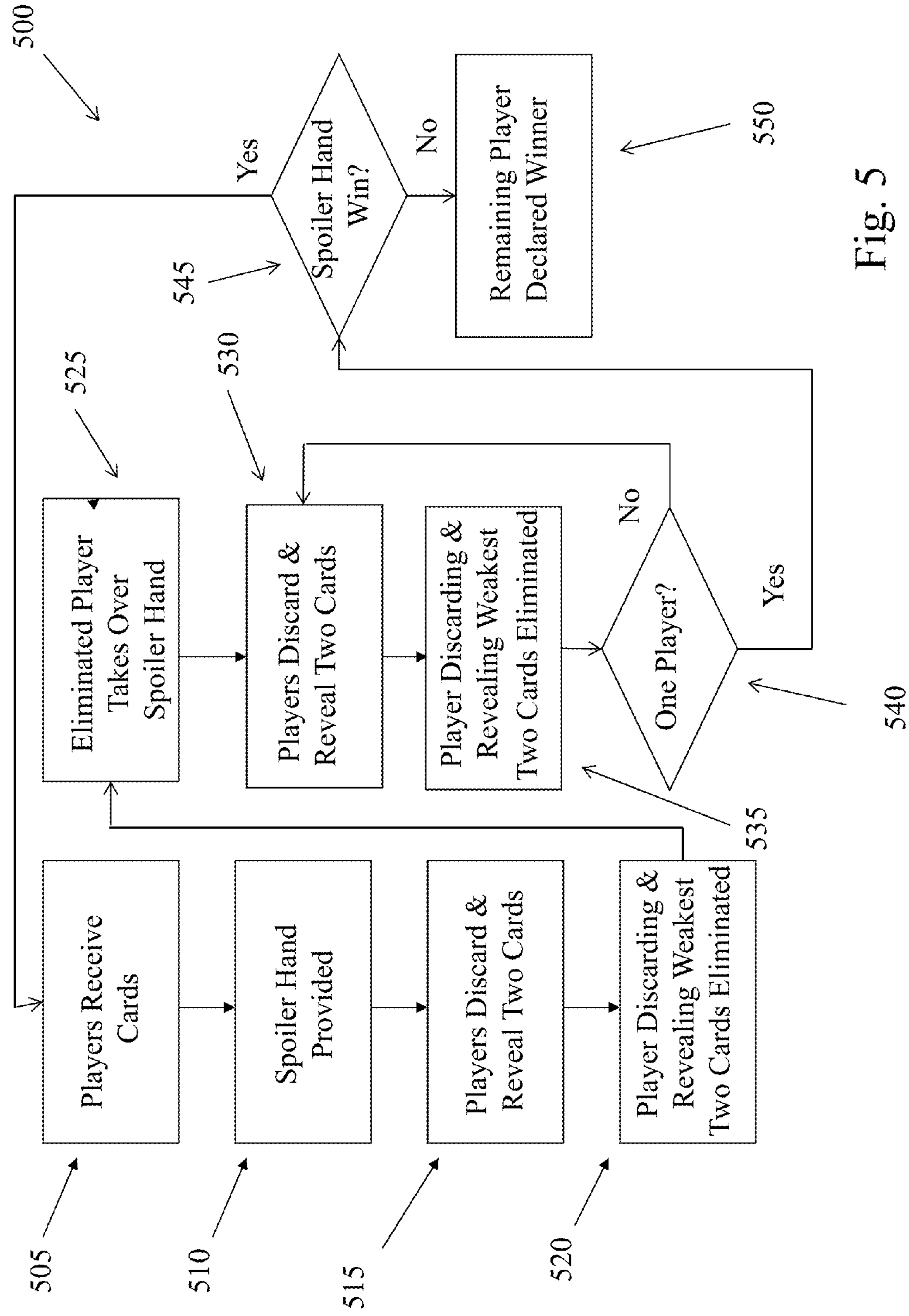
FIG. 5 illustrates a flow chart detailing one methodology for conducting a player v. player (e.g., home version) game according to the embodiments of the present invention.

FIG. 5 shows a flow chart 500 detailing a methodology of the player v. player embodiment of the present invention. At 505, players are provided or dealt cards. The number of cards is dependent on the number of players. For example, in a three player game, each player receives four cards while in a four player game, each player receives six cards. At 510, an optional spoiler hand is provided or dealt. At 515, each player discards and reveals two cards. At 520, a player discarding and revealing the weakest cards is eliminated. If a spoiler hand is dealt, at 525, the first player eliminated takes over the spoiler hand. At 530, each remaining player and the player taking over the spoiler hand each discard and reveal two cards. At 535, a player discarding and revealing the weakest cards is eliminated. At 540, it is determined if only one player remains. If not, the chart 500 loops back to 530. If, at 540, it is determined that only one player remains, at 545, it is determined if the remaining player played the spoiler hand. If so, the chart loops back to 505 and the game is played again. If, at 545, it is determined that the remaining player did not play the spoiler hand, at 550, the remaining player is declared the winner. In a version with gambling, if the player with the spoiler hand wins, each player re-wagers and the next game is played for double the stakes or pot.

In any of the embodiments detailed herein, jokers may be added to the one or more decks of cards. In one embodiment, jokers have no independent value but may be used to form pairs such that a joker with any other card is deemed a pair but two jokers together have no value.

Although the invention has been described in detail with reference to several embodiments, additional variations and modifications exist within the scope and spirit of the invention as described and defined in the following claims.

We claim:

1. A method comprising:

(i) providing three or more players with four or more initial cards and no other cards during play from one or more decks of cards, each of said one or more decks of cards including at least fifty-two cards comprising thirteen cards depicting Hearts and numbers 2 to 10, Jack, Queen, King and Ace, thirteen cards depicting Diamonds and numbers 2 to 10, Jack, Queen, King and Ace, thirteen cards depicting Spades and numbers 2 to 10, Jack, Queen, King and Ace, thirteen cards depicting Clubs and numbers 2 to 10, Jack, Queen, King and Ace;

(ii) requiring each player to discard and reveal face up to all other players simultaneously one or more cards comprising less than all of said initial cards during each round of play, said revealed discards being deemed out of play;

(iii) eliminating from play one or more players revealing face up to all other players a weakest of said one or more cards or poker hands formed of multiple cards during each round of play and deeming out of play cards held by said one or more eliminated players; and (iv) repeating steps (ii) and (iii) until a final player remains and declaring said final player a winner.

2. The method of claim 1 further comprising providing a spoiler hand with two less cards than each other player hand, said spoiler hand playable by a first player eliminated from play.

3. The method of claim 1 further comprising pre-establishing a kill hand which outranks all other hands.

4. The method of claim 1 further comprising utilizing a tie breaker process whereby players involved in a tie each select a random card from the one or more decks not already used during the game and comparing ranks thereof to determine a winner based on highest rank.

5. An electronically-implemented method comprising:

utilizing a network of computer terminals, said computer terminals having at least a display, user interface and memory, said computer terminals relying on one or more integral or remote processors running executable instructions to play a game, said one or more processors configured to perform the following steps:

(i) presenting on said displays of said computer terminals four or more initial simulated cards and no more cards from one or more decks of cards, each of said one or more decks of cards including at least fifty-two simulated cards comprising thirteen cards depicting Hearts and numbers 2 to 10, Jack, Queen, King and Ace, thirteen cards depicting Diamonds and numbers 2 to 10, Jack, Queen, King and Ace, thirteen cards depicting Spades and numbers 2 to 10, Jack, Queen, King and Ace, thirteen cards depicting Clubs and numbers 2 to 10, Jack, Queen, King and Ace;

(ii) requiring each player to discard and reveal face up to all other players simultaneously one or more cards comprising less than all of said initial simulated cards during each round of play said revealed discards being deemed out of play;

(iii) comparing the revealed one or more cards of each player;

(iv) eliminating from play one or more players revealing face up to all other players a weakest of said one or more cards or poker hands formed of multiple cards during each round of play and deeming out of play cards held by said one or more eliminated players; and (v) repeating steps (ii) through (iv) until a final player remains and declaring said final player a winner declaring a final player remaining after a final round a winner.

6. The electronically-implemented method of claim 5 further comprising replaying the game responsive to a player playing a spoiler hand, said spoiler hand playable by a first player eliminated from play.

7. The electronically-implemented method of claim 5 further comprising identifying a pre-established kill hand which outranks all other hands.

8. The electronically-implemented method of claim 5 further comprising utilizing a tie breaker process whereby players involved in a tie each select a random card from the cards not already used during the game and comparing ranks thereof to determine a winner based on highest rank.

9. An electronically-implemented method comprising:

utilizing a network of computer terminals, said computer terminals having at least a display, user interface and memory, said computer terminals relying on one or more integral or remote processors running executable instructions to play a game, said one or more processors configured to perform the following steps:

(i) presenting on said displays of said computer terminals four or more initial simulated cards and no more cards from one or more decks of cards, each of said one or more decks of cards including at least fifty-two simulated cards comprising thirteen cards depicting Hearts and numbers 2 to 10, Jack, Queen, King and Ace, thirteen cards depicting Diamonds and numbers 2 to 10, Jack, Queen, King and Ace, thirteen cards depicting Spades and numbers 2 to 10, Jack, Queen, King and Ace, thirteen cards depicting Clubs and numbers 2 to 10, Jack, Queen, King and Ace;

(ii) requiring each player to discard and reveal face up to all other players simultaneously two or more cards comprising less than all of said initial simulated cards during each round of play, said revealed discards being deemed out of play;

(iii) comparing the revealed two cards of each player;

(iv) eliminating from play one or more players revealing face up to all other players a weakest of said two cards during each of said one or more rounds of play and deeming out of play cards held by said one or more eliminated players; and (v) repeating steps (ii) through (iv) until a final player remains and declaring said final player a winner declaring a final player remaining after a final round a winner.

10. The electronically-implemented method of claim 9 further comprising replaying the game responsive to a player playing a spoiler hand, said spoiler hand playable by a first player eliminated from play.

11. The electronically-implemented method of claim 9 further comprising identifying a pre-established kill hand which outranks all other hands.

12. The electronically-implemented method of claim 9 further comprising utilizing a tie breaker process whereby players involved in a tie each select a random card from the cards not already used during the game and comparing ranks thereof to determine a winner based on highest rank.

* * * * *